United States Patent Office 2,971,890
Patented Feb. 14, 1961

2,971,890
FERMENTATIVE PROCESS FOR PRODUCING L-GLUTAMIC ACID FROM FUMARIC ACID

Tetsuo Ogawa, Tokyo, Toshinao Tsunoda, Zushi-shi, and Ryohei Aoki, Kazumoto Kinoshita, and Shinji Okumura, Tokyo, and Yasuhiro Kondo, Kawaguchi-shi, all in Japan, assignors to Ajinomoto Co., Inc., Tokyo, Japan, a corporation of Japan No Drawing. Filed Mar. 18, 1958, Ser. No. 722,147

Claims priority, application Japan Apr. 16, 1957

3 Claims. (Cl. 195—30)

The present invention relates to a process for producing L-glutamic acid. More particularly, this invention relates to a process for the production of L-glutamic acid by fermentation from fumaric acid which may be prepared by either chemical synthesis or fermentation.

In the heretofore known processes for producing L-glutamic acid by the utilization of microorganisms, there have been used, as principal materials, carbohydrates such as starch, glucose and other sugars or α-ketoglutaric acid. Having observed that all these processes are not satisfactory from industrial and economical points of view, the inventors conducted their exhaustive studies of the fermentation of fumaric acid and succeeded in directly producing L-glutamic acid with an extremely high yield.

When a compound the TCA-cycle is chosen as the substrate, the amount of produced-L-glutamic acid is considered to depend upon the balance among conjugated enzymes. Experiments with reactions of enzymes in animal tissues, e.g. liver, on the compounds in the TCA-cycle, which were chosen as the substrate, showed that the amount of glutamic acid converted from fumaric acid is extremely small in comparison with that converted from citric acid, succinic acid or α-ketoglutaric acid. This is because a remarkable quantity of aspartic acid is produced by the action of aspartase, so that the formation of glutamic acid is greatly suppressed, in the case where fumaric acid is chosen as the substrate. Also with certain bacteria, e.g. *Escherichia coli,* similar results were observed.

The inventors have found that many kinds of microorganisms produce L-glutamic acid if they are cultured under proper conditions in media containing fumaric acid as the main carbon source together with inorganic nitrogen source compounds. Having in mind the favorable prospect of industrial production of L-glutamic acid by fermentation from fumaric acid as the main carbon source, the inventors searched for the most suitable microorganisms and successfully found many superior strains.

The microorganisms newly isolated by the inventors which change fumaric acid into L-glutamic acid, in other words, the microorganisms which accumulate L-glutamic acid in culture media containing mainly fumaric acid as the carbon source, were found to be of wide distribution in the natural world. They may be found almost everywhere so far as usual microorganisms can live at all, for example, in soil, sewage and the like. They are mainly aerobic bacteria or facultative anaerobic bacteria such as Pseudomonas, Xanthomonas, Protaminobacter, Micrococcus, Corynebacterium, Serratia, Alcaligenes, Achromobacter, Flavobacterium, Escherichia, Aerobacter, Sarcina, Proteus, Bacillus, Bacterium and the like.

It is a principal object of this invention to produce L-glutamic acid directly from a compound without passing through intermediate stages as is usual in chemical synthesis.

It is a further object of the present invention to produce L-glutamic acid with ease and an extremely high yield.

It is a further object of the instant invention to produce L-glutamic acid from fumaric acid, as the carbon source, which may be easily obtained by chemical synthesis or by fermentation.

Further objects of this invention will become apparent from the following description of processes embodying the invention and specific examples thereof.

Processes for producing L-glutamic acid in accordance with this invention may be carried out with either a synthetic medium which contains mainly fumaric acid as the carbon source besides a nitrogen source, such as, ammonium nitrate or urea, as well as some mineral salts essential to microorganism growth, such as, potassium phosphate, magnesium sulfate, ferrous sulfate, and the like, and has been neutralized, or a complex medium which contains for the most part fumaric acid and to which has been added a small quantity of sugar (such as glucose, fructose, lactose, maltose, sucrose, pentose or molasses), organic acids, organic or inorganic nitrogenous nutrients (such as soybean cake, fish meal, casein, peptone, meat-extract, yeast extract, malt extract, koji-extract or amino acid), inorganic salts and vitamins. Such a medium is inoculated with a strongly L-glutamic acid-producing bacterium selected from among above-listed microorganisms and subjected to aerobic submerged culture or static culture at its growth temperature. The inoculated microorganisms grow in the medium, fumaric acid is assimilated and L-glutamic acid is gradually accumulated in the medium, its amount being increased by degrees as the fermentation period proceeds. Contrary to expectation, there is only slight formation of amino acids other than L-glutamic acid and only a small quantity of aspartic acid is produced in those cases where certain kinds of the microorganisms are used. Separation of L-glutamic acid from the fermentation broth and purification thereof may be easily performed by a conventional process well known in the art. For example, fermentation broth from which bacterial cells have been separated is concentrated to cause L-glutamic acid to crystallize out at its isoelectric point. Ion-exchange resins may also be utilized for separation of the L-glutamic acid.

The following examples are given to afford a clearer understanding of the invention but are not to be construed as limiting the same:

Example 1

A culture medium, 100 cc. in volume, containing 1.0 g. of fumaric acid, 0.1 g. of glucose, 0.1 g. of $KH_2PO_4$, 0.02 g. of $MgSO_4 \cdot 7H_2O$ and 0.1 g. of $(NH_4)_2SO_4$ and neutralized by sodium hydroxide to pH 7.0, was inoculated with *Bacillus pumilus* and subjected to shaking culture at 30° C. After 38 hours, 0.22 g. of L-glutamic acid was obtained in the fermentation broth. This yield shows almost quantitative formation of L-glutamic acid from 21 mg. of nitrogen contained in said culture medium.

Example 2

Three culture media, each 100 cc. in volume and containing 4 g. of fumaric acid, 2 g. of glucose, 0.1 g. of $KH_2PO_4$ and 0.04 g. of $MgSO_4 \cdot 7H_2O$, with 3 cc. of ammonia water (20 grams per deciliter) added thereto and neutralized with KOH aqueous solution was inoculated with the following strains respectively and subjected to shaking culture at 30° C. After 72 hours, the following amounts of glutamic acid was obtained in each culture.

| Microorganism: | L-glutamic acid (grams per deciliter) |
|---|---|
| *Bacillus pumilus* variety α | 2.80 |
| *Bacillus pumilus* variety β | 3.60 |
| *Bacillus pumilus* variety γ | 3.00 |

Example 3

11 culture media each, 100 cc. in volume and containing 4 g. of fumaric acid, 1 g. of glucose, 0.1 g. of $KH_2PO_4$ and 0.04 g. of $MgSO_4 \cdot 7H_2O$, with 3 cc. of ammonia water (20 grams per deciliter) added thereto and neutralized with KOH aqueous solution was inoculated with the following microorganism respectively and subjected to shaking culture at 30° C. After 72 hours, the following amounts of glutamic acid was obtained in each culture.

| Microorganism: | L-glutamic acid (grams per deciliter) |
|---|---|
| Pseudomonas aeruginosa | 0.20 |
| Xanthomonas pruni | 0.20 |
| Micrococcus pyogenes | 0.30 |
| Escherichia coli | 0.60 |
| Aerobacter aerogenes | 0.50 |
| Serratia marcescens | 0.50 |
| Bacillus subtilis No. 1 | 2.00 |
| Bacillus subtilis No. 2 | 1.10 |
| Bacillus cereus | 0.20 |
| Bacillus megatherium | 0.30 |
| Bacillus natto | 0.40 |

What we claim is:

1. A fermentive process for producing L-glutamic acid comprising the steps of approximately neutralizing a culture medium containing fumaric acid as the main carbon source, a nitrogen source and mineral salts essential to living microorganisms, inoculating said medium with a living microorganism selected from the group consisting of Bacillus pumilus, Bacillus subtilis, Aerobacter aerogenes, Serratia marcescens, Bacillus natto, Bacillus megatherium, Bacillus cereus, Escherichia coli, Micrococcus pyogenes, Xanthomonas pruni and Pseudomonus aeruginosa, subjecting the inoculated medium to a culture at its growth temperature to accumulate L-glutamic acid, and separating the L-glutamic acid from the fermentation broth.

2. A process for producing L-glutamic acid as in claim 1; wherein said nitrogen source is selected from the group consisting of ammonium salts, ammonia and urea.

3. A process for producing L-glutamic acid as in claim 1; wherein said culture medium is approximately neutralized with ammonia and alkali hydroxide.

References Cited in the file of this patent

UNITED STATES PATENTS 2,749,279   Smythe _____ June 5, 1956

OTHER REFERENCES

"Journal of Biological Chemistry," vol. 187, pp. 821–830 (1950).

"The Enzymes," by Summer et al., vol. II, part 2, Academic Press Inc., New York (1952), pp. 1117–1118.

Proc. of the Int. Symposium on Enzyme Chemistry, Tokylo and Kyoto, 1957, pages 464–468, Maruzen, Tokyo, 1958.

Chemical Abstracts, vol. 51, pages 7643–7644, 1957.

UNITED STATES PATENT OFFICE
CERTIFICATION OF CORRECTION

Patent No. 2,971,890            February 14, 1961

Tetsuo Ogawa et al.

It is hereby certified that error appears in the above numbered patent requiring correction and that the said Letters Patent should read as corrected below.

In the grant, lines 4 and 14, and in the heading to the printed specification, line 7, name of assignee, for "Ajinomotor Co., Inc.", each occurrence, read -- Ajinomoto Co., Inc. --.

Signed and sealed this 13th day of June 1961.

(SEAL)
Attest:

ERNEST W. SWIDER            DAVID L. LADD
Attesting Officer            Commissioner of Patents